May 16, 1961 W. C. JOHNSON 2,983,994
METAL ARTICLES HAVING HOLLOW SECTIONS AND METHOD OF MAKING SAME
Filed Aug. 1, 1955 2 Sheets-Sheet 1

INVENTOR:
WALLACE C. JOHNSON
BY Howson & Howson
ATTYS.

May 16, 1961     W. C. JOHNSON     2,983,994
METAL ARTICLES HAVING HOLLOW SECTIONS AND METHOD OF MAKING SAME
Filed Aug. 1, 1955     2 Sheets-Sheet 2
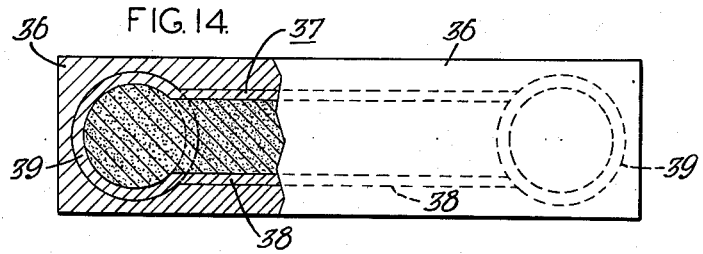
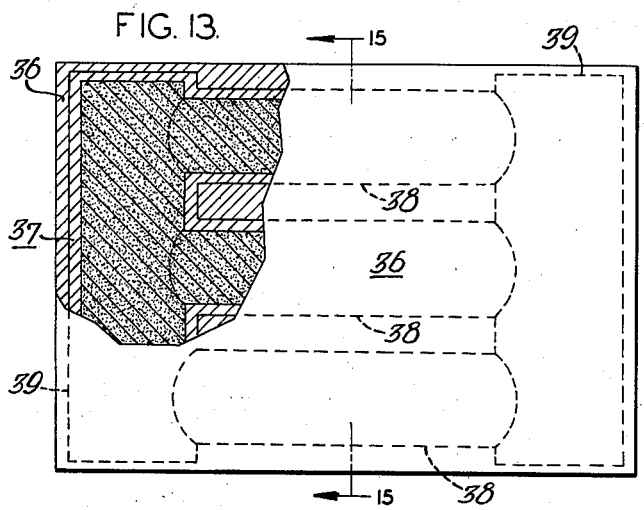
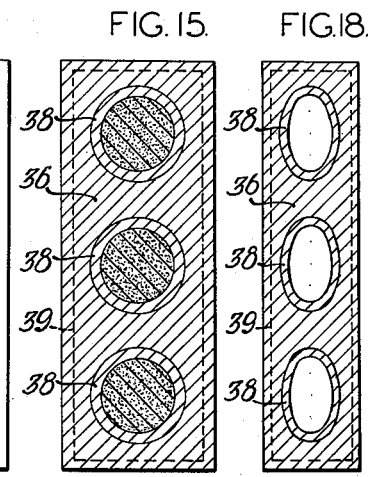
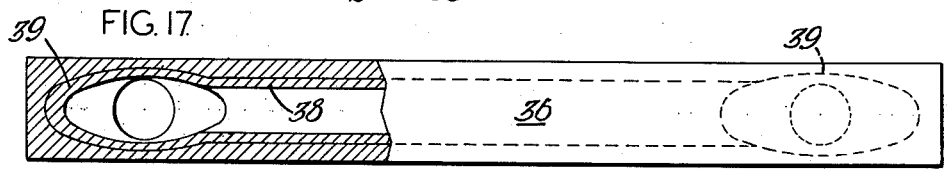
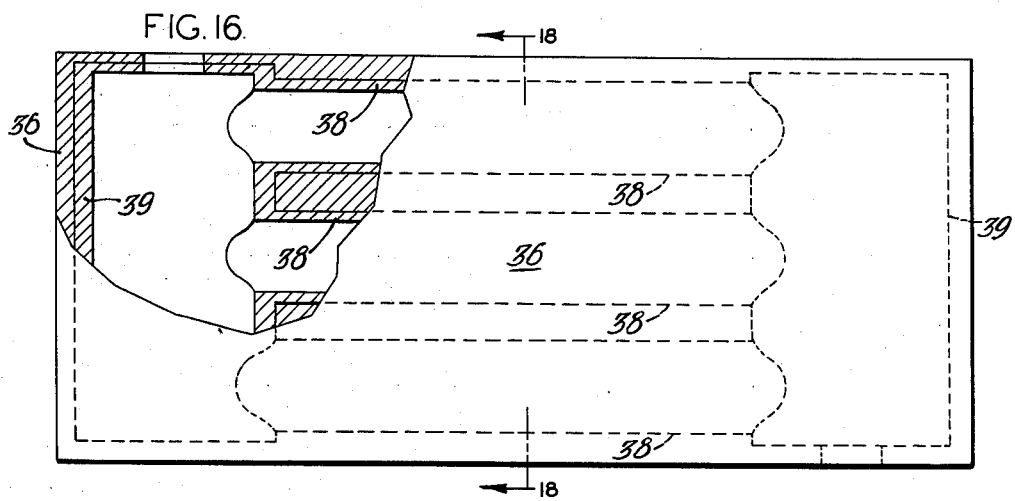
INVENTOR:
WALLACE C. JOHNSON
BY Howson & Howson ATTYS United States Patent Office 2,983,994
Patented May 16, 1961

2,983,994

METAL ARTICLES HAVING HOLLOW SECTIONS AND METHOD OF MAKING SAME

Wallace C. Johnson, St. Davids, Pa., assignor to Olin Mathieson Chemical Corporation, East Alton, Ill., a corporation of Virginia Filed Aug. 1, 1955, Ser. No. 525,578

4 Claims. (Cl. 29—157.3)

This invention relates to metal articles having hollow sections and to the making of such articles by a process which includes the steps of forming a structure having internal voids or spaces with stop-weld material therein, hot rolling the structure to a substantially reduced thickness, cold rolling the structure to the desired final thickness, and removing the stop-weld material. The invention further relates to such process where it is utilized in the making of articles having inflated hollow sections which are produced by introducing fluid pressure into the voids or spaces occupied by the stop-weld material.

In the past, articles having hollow sections have been formed by first forming a pack structure composed of superposed metal members with stop-weld material therebetween in the areas which are to become the hollow sections, then corner welding or edge welding the pack structure to integrate it sufficiently for handling, then hot rolling the pack structure to effect weld bonding of the interengaging surfaces of the metal members and to effect substantial reduction of the thickness of the structure, then cold rolling the structure to the desired final thickness, and finally inflating the unwelded areas of the metal members to form the desired hollow sections by introduction of fluid pressure. Such process is expensive and time consuming, as it involves the formation of the pack structure and the corner or edge welding of the same.

The principal object of the present invention is to provide a relatively simple and inexpensive method for the formation of metal articles having hollow sections.

Another object of the invention is to provide novel articles produced by such method.

According to this invention, a body (which may be cast in a mold or which may be die cast) is provided about one or more core elements containing stop-weld material, and the body is hot rolled and/or cold rolled with the core elements therein to effect reduction to the desired thickness, after which the stop-weld material is removed, leaving voids or passages in the rolled body. Where it is desired to form an article having inflated hollow sections, such sections are formed by introducing fluid pressure into the voids or passages in the rolled body.

The term "stop-weld material" is used herein to designate a material which will flow with the metal of the cast body during both hot and cold rolling and which, during rolling to a thinner gauge, preserves internal voids or spaces within the body. Although the internal voids or spaces may become quite flat as the result of rolling, the stop-weld material will prevent any welding of the internal surfaces.

The invention may be fully understood from the following detailed description with reference to the accompanying drawing wherein Fig. 1 is a perspective view of a cast metal body into which stop-weld core elements are inserted in accordance with one embodiment of the present invention;

Fig. 2 is a side elevational view illustrating the rolling of the body to effect reduction to the desired thickness;

Fig. 3 is an end elevational view of the body prior to rolling;

Fig. 4 is a similar view after rolling and after removal of the stop-weld material;

Fig. 5 is a perspective view of a stop-weld core element according to another embodiment of the invention;

Fig. 6 is a fragmentary perspective view of a metal body cast about stop-weld core elements of the character shown in Fig. 5;

Fig. 7 is an end elevational view of the body prior to rolling;

Fig. 8 is a similar view after rolling;

Fig. 9 is an end elevational view of a further cast structure;

Fig. 10 is a similar view of the structure after rolling;

Fig. 11 is an end elevational view of a structure such as shown in Fig. 4 rolled to a relatively small thickness;

Fig. 12 is a similar view of the same structure after inflation of the hollow sections;

Fig. 13 is a plan view of a further cast structure;

Fig. 14 is an elevational view of the same;

Fig. 15 is a sectional view taken on line 15—15 of Fig. 13;

Fig. 16 is a plan view of the structure after rolling;

Fig. 17 is an elevational view after rolling; and

Fig. 18 is a sectional view taken on line 18—18 of Fig. 16.

Referring first to Figs. 1 and 3 there is shown a cast metal body 20 in the form of a rectangular block in which voids or passages 21 have been provided in the course of casting by using suitable core elements. After removal of the core elements employed during casting, stop-weld material is inserted in the openings or passages shown in Fig. 1. The stop-weld material, as a damp sand-like composition, may be rammed into the passages and dried, or as shown in Fig. 1 core elements 22 may be inserted in the openings or passages. Each of these core elements is in the form of a preformed unit shaped and dimensioned to fit snugly within the openings 21. As clearly shown in Fig. 1, each of these elements may comprise suitable stop-weld material 23 molded or cast to the desired shape and a covering layer 24 which serves to retain the stop-weld material and to facilitate handling of the element. The layer 24 may be in the form of a wrapping, as shown, of a suitable material such as paper which will char during the subsequent hot rolling operation.

After insertion of the stop-weld core elements into the apertures of the cast block or body, the structure is hot rolled and/or cold rolled, depending upon the kind of metal employed and the extent to which the thickness is to be reduced. If the structure is to be hot rolled, it is heated in a furnace to a suitable temperature sufficient for hot rolling to effect substantial reduction of its thickness. The temperature will depend of course upon the metal of which cast block or body is formed. For example in the case of a cast steel block or body, a temperature of approximately 2100° F. is required for the hot rolling.

During the rolling operation, the structure is rolled lengthwise, i.e. in the lengthwise direction of the core elements. Fig. 2 shows the rolling of the structure by passing it between pressure rolls 25 and 26. During rolling, the structure is elongated but its width is not appreciably affected. The apertures, filled with the stop-weld material, are distorted from their original cross-sectional shape. Thus, where the apertures are originally circular, as shown, they become elliptical in cross sectional shape as shown in Fig. 4. After hot rolling to effect substantial reduction of thickness, the structure may be cold rolled to the desired final thickness.

It is important that the stop-weld material employed be of such character that it will flow to the extent necessary during hot rolling and/or cold rolling and at the same time preserve the apertures or passages even though the structure may be rolled quite thin in thickness. By way of example the stop-weld material may be a mixture of 10% mica, 87% ziroconium silicate-sand, and 3% bentonite clay. The constituents of this stop-weld material can be varied within ranges of 2–8% of bentonite clay and 5–20% mica. The sand should be rather fine, e.g. capable of passing through a 40-mesh screen, in order that it will not objectionably scratch the inner metal surfaces. Where preformed core elements are to be employed, the mixture may be moistened to putty-like form, and then it may be molded, dried and baked at a temperature of approximately 300° F. The paper wrapping may be applied before or after baking, as the paper will not char at the baking temperature. The paper may be cemented on to the element by any suitable cement such as silicate of soda (water glass).

It is necessary of course to remove the stop-weld material from the passages in the final article. This may be done by at least partially inflating the structure as described below and by flushing the material out of the passages as by means of a stream of water or air under pressure.

Where it is desired to form an article having inflated hollow sections, the inflation may be effected, after rolling to the final thickness, by sealing one end of the passages and introducing fluid pressure into the passages to effect inflation, in the same manner that the inflation step has been performed in the past to form hollow sections in an article produced by hot roll bonding of superposed metal members as hereinbefore mentioned. The inflation may be performed with or without the use of restraining dies, depending upon the degree of inflation desired.

Where inflation is performed merely to enable removal of the stop-weld material and it is desired to produce an article of uniform thickness, the inflated article may be re-rolled to uniform thickness after the stop-weld material has been washed out.

Figs. 6 to 8 show another embodiment of the method according to this invention, in which the metal block or body is cast about preformed core elements containing stop-weld material. In Figs. 6 and 7 there is shown a rectangular metal block or body 27 which has been cast about core structures 28 each comprising stop-weld material 29 such as above mentioned and a metal tube 30. Fig. 5 shows one of the core structures prior to its use in the casting of the body 27. In this instance, the metal tube 30 not only serves as a retainer for the stop-weld material, but it also serves as an internal cladding or lining in the finished product. This is desirable where it is desired to provide an internal cladding or lining within the passages of the finished article, as where it is desired to provide a rust-proof lining. By way of example the cast block or body 27 might be formed of steel, and the tube 30 of each core structure might be formed of copper or stainless steel.

In this intsance, the above-mentioned stop-weld mixture may be moistened to putty-like form and may be inserted in the metal tube to fill the same. The mixture may then be dried and baked at a temperature of approximately 300° F.

The structure shown in Figs. 6 and 7 is hot rolled and/or cold rolled as in the case of the first embodiment. Fig. 8 shows the structure after rolling, the tubes 30 being flattened to elliptical form from their original circular shape. The stop-weld material is removed by flushing or washing as previously described.

Here again where it is desired to form an article having inflated hollow sections, the inflation may be effected by introduction of fluid pressure within the passages.

Fig. 9 shows a rectangular metal block or body 31 which has been cast about core structures 32 similar to that of Fig. 5 but with the metal tube of each core structure partially flattened to ovate form. Fig. 10 shows the structure after rolling and after removal of the stop-weld material as above described.

Any of the above-described structures may be rolled to a relatively small thickness and may be inflated at the hollow sections. Thus Fig. 11 shows a structure 33 similar to that of Fig. 4 but rolled to a small thickness. After inflation between restraining dies, by sealing one end of the passages 34 and introducing fluid pressure thereto, the structure is of the form shown in Fig. 12, having thin walled hollow sections 35.

Figs. 13 to 15 show a rectangular metal body 36 cast about an internal core structure 37 fabricated from metal tubes. In the form shown, the internal core structure 37 comprises three metal tubes 38 connected as by welding to two larger diameter metal tubes 39. The tubes 38 and 39 are filled with suitable stop-weld material such as that previously mentioned. A fabricated and cast structure of this character may be employed, for example, where it is desired to construct an article such as a heating radiator having rust-proof inner surfaces. Thus the cast body may be formed of relatively inexpensive cast steel, while the internal structure may be formed of copper.

Figs. 17 to 18 show the structure after it has been hot and cold rolled in the lengthwise direction of tubes 38. Such rolling causes elongation of the structure and some flattening of tubes 38 without appreciably changing the width of the structure. The rolling also causes substantial flattening of the tubes 39.

After rolling to the desired thickness, the stop-weld material is washed out by partially inflating the structure between restraining dies to facilitate the washing operation. Then the structure is rolled to uniform thickness, the finished article being as shown in Figs. 16 and 17.

While certain embodiments of the invention have been illustrated and described, the invention is not limited thereto but contemplates such further embodiments or modifications as may occur to those skilled in the art.

I claim:

1. A method of making metal articles having at least one hollow section, which comprises forming at least one core structure comprising a hollow metal structure by disposing at least two first metal tubes in spaced relationship to each other and interconnecting said first tubes by at least one second metal tube in communicating relationship therewith with said second tube disposed in a direction transverse the directions of said first tubes, filling with non-metallic stop-weld material capable of flowing with the metal of said structure during rolling, casting a metal body about said structure, rolling said body with the core structure therein to the desired thickness, and removing the stop-weld material leaving internal voids or spaces within said body.

2. A method of making metal articles having at least one hollow section which comprises forming at least one core structure comprising a hollow metal structure by disposing at least two first metal tubes in spaced relationship to each other and interconnecting said first tubes by at least one second metal tube in communicating relationship therewith with said second tube disposed in a direction transverse the directions of said first tubes, filling with non-metallic stop-weld material capable of flowing with the metal of said structure during rolling, casting a metal body about said structure, rolling said body with the core structure therein to the desired thickness, introducing fluid pressure to the internal spaces to inflate the metal, and removing the stop-weld material leaving internal voids or spaces within said body.

3. A method of making metal articles from a cast metal body having at least one hollow section, which comprises forming at least one core structure by disposing at least two first rust-proof hollow metal tubes in spaced relationship to each other and interconnecting said first tubes by at least one second rust-proof hollow metal tube in communicating relationship therewith with said second tube disposed in a direction transverse the directions of said first tubes, filling with non-metallic stop-weld material capable of flowing with the metal of said body during rolling, casting a metal body about said structure, rolling said body with the core structure therein to the desired thickness, and removing the stop-weld material leaving internal voids or spaces having rust-proof surfaces within said body.

4. The method of claim 3 wherein said stop-weld material comprises zirconium silicate, mica and bentonite clay.

References Cited in the file of this patent

UNITED STATES PATENTS

| | | |
|---|---|---|
| 29,276 | Holmes | July 24, 1860 |
| 377,317 | Marshall | Jan. 31, 1888 |
| 377,318 | Marshall | Jan. 31, 1888 |
| 1,127,041 | Lloyd | Feb. 2, 1915 |
| 1,938,633 | Maskrey | Dec. 12, 1933 |
| 2,498,275 | Johnson | Feb. 21, 1950 |
| 2,662,273 | Long | Dec. 15, 1953 |
| 2,690,002 | Grenell | Sept. 28, 1954 |
| 2,772,180 | Neel | Nov. 27, 1956 |

FOREIGN PATENTS

| | | |
|---|---|---|
| 1,467 | Great Britain | Jan. 31, 1888 |
| 401,476 | Germany | Sept. 8, 1924 |
| 472,790 | Canada | Apr. 10, 1951 |